United States Patent [19]

Ancarani Restelli

[11] Patent Number: 4,642,073
[45] Date of Patent: Feb. 10, 1987

[54] GUIDE FOR FLEXIBLE ENDLESS DRIVE MEMBER

[75] Inventor: Amedeo Ancarani Restelli, Cernusco Lombardone, Italy

[73] Assignee: Societa' Italiana Catene Calibrate Regina S.p.A., Milan, Italy

[21] Appl. No.: 648,615

[22] Filed: Sep. 10, 1984

Related U.S. Application Data

[63] Continuation of Ser. No. 345,794, Feb. 4, 1982, abandoned.

[30] Foreign Application Priority Data

Feb. 6, 1981 [IT] Italy ............................... 19578 A/81

[51] Int. Cl.[4] .............................................. F16H 7/08
[52] U.S. Cl. .................... 474/111; 474/140; 474/151
[58] Field of Search ............... 474/109, 110, 111, 140, 474/144, 146, 151; 74/608, 609, 612, 613; 83/818, 819

[56] References Cited

U.S. PATENT DOCUMENTS

| | | | |
|---|---|---|---|
| 39,015 | 6/1863 | House | 474/109 |
| 935,036 | 9/1909 | Lott | 474/146 |
| 1,108,085 | 8/1914 | Sewall | 474/109 |
| 1,257,660 | 2/1918 | Willis | 474/109 |
| 1,262,318 | 4/1918 | Fitzgerald | 474/109 |
| 1,530,682 | 3/1925 | Lyman | 83/818 |
| 3,575,058 | 4/1971 | Kraus | 474/109 |
| 3,811,332 | 5/1974 | Brown et al. | 474/111 |
| 3,869,138 | 3/1975 | Allison | 474/111 |
| 3,979,964 | 9/1976 | McCordall | 474/111 |
| 4,299,582 | 11/1981 | Leitner | 474/109 |
| 4,337,055 | 6/1982 | Mackey et al. | 474/111 |

FOREIGN PATENT DOCUMENTS

| | | | |
|---|---|---|---|
| 144165 | 6/1902 | Fed. Rep. of Germany | 474/144 |
| 1118560 | 11/1961 | Fed. Rep. of Germany | 474/111 |
| 1528032 | 6/1970 | Fed. Rep. of Germany | 83/819 |

Primary Examiner—John E. Murtagh
Assistant Examiner—Andrew Joseph Rudy
Attorney, Agent, or Firm—Cushman, Darby & Cushman

[57] ABSTRACT

The invention relates to a rocking idler for guiding driving members such as roller chains, belts and like members, comprising a hub adapted to be freely rockably mounted on the same axis of rotation of a driving mechanism, said hub having extending therefrom in a diverging manner a couple of guiding means adapted to receive the respective two laps, the taut lap and the slackening lap of the chain and like driving means which is a part of the driving assembly.

3 Claims, 4 Drawing Figures

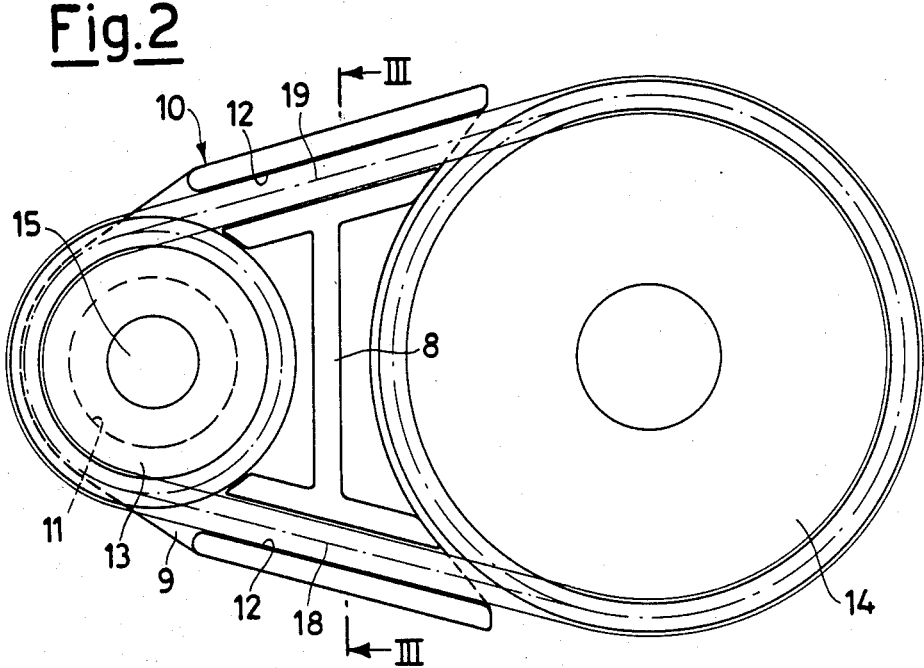
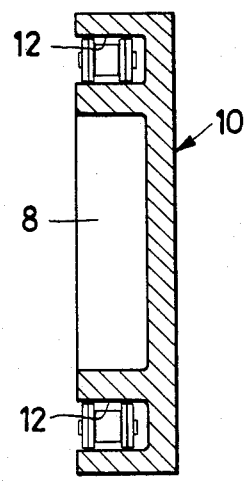

GUIDE FOR FLEXIBLE ENDLESS DRIVE MEMBER

This is a continuation of application Ser. No. 345,794, filed Feb. 4, 1982 now abandoned.

This invention relates to a rocking guiding pad for driving members, more particularly a flexible endless drive member such as a roller chain of the timing control unit of an internal combustion engine.

It is known that such roller chains, after a certain time of service, have their length increased relative to the starting dimensions. During the motion, the roller chain which connects two or more rotatable members, such as wheels or gears, exhibits a taut lap and a slackening lap.

During its rotation, the chain tends to receive an irregular floating motion and especially the slackening lap tends to oscillate and to flutter. If the irregular motion is not confined within more acceptable boundaries, this fact might originate a rapid wear of the chain, the result being an increase of the overall chain length.

An exceedingly high elongation, if it is not properly counteracted by an idler, may originate an irregular angular swing of the driving assembly.

In the internal combustion engines, wherein the timing chain has a substantial length and the axes are spaced part far from one another, resort is usually had to fixed guiding pads for the taut lap and to resiliently biassed idlers for the slackening lap.

In the engines having camshafts on the bed of the engine, wherein the two axes are close to one another, so that the overall chain length is reduced, what is difficult is to fasten fixed guiding pads for the taut lap and of idlers for the slackening lap.

In addition, the application of such pads and idlers to existing engines would imply, if and when practicable, modifications to the engine casing so that also the expensive assembly lines for the engines should consequently be modified and, at any rate, the interchangeability of the pieces with those of the previous engine types, on which such devices could never be installed, cannot be obtained.

It is thus an object of the present invention, in the first place, to provide a rocking pad capable of confining the oscillatory motion of the chain and thus its wear and the elongation resulting therefrom, said device being especially adapted for engines having a camshaft on the engine bed, which is also capable of being applied, without any special modifications to the engine bed, to existing internal combustion engines.

An additional object of the present invention is to provide a rocking guiding pad adapted to confine the noise produced by the chain, even after a long service life and when the chain has already undergone a certain elongation.

Having the above objects in view, according to the invention, it has been envisaged to provide an idler characterized in that it comprises a hub portion capable of being freely and rockably mounted on the same axle of rotation of a driving mechanism, there being extended from said hub portion two guideways capable of receiving the two laps, the taut lap and the slackening lap, respectively, of a chain belonging to said driving mechanism.

According to a possible embodiment of the invention, either guideways is rockably connected to the hub portion and is thrust by biassing members against the relative chain lap.

The structural and functional features of the invention and its advantages over the prior art will become still more clearly apparent from the scrutiny of the ensuing exemplary description aided by the accompanying drawings, wherein:

FIG. 2 is a showing of the idler of FIG. 1 as mounted on a sprocket and chain driving assembly.

FIG. 3 is a cross-sectional view taken along the line III—III of FIG. 2, and

Figure 1:
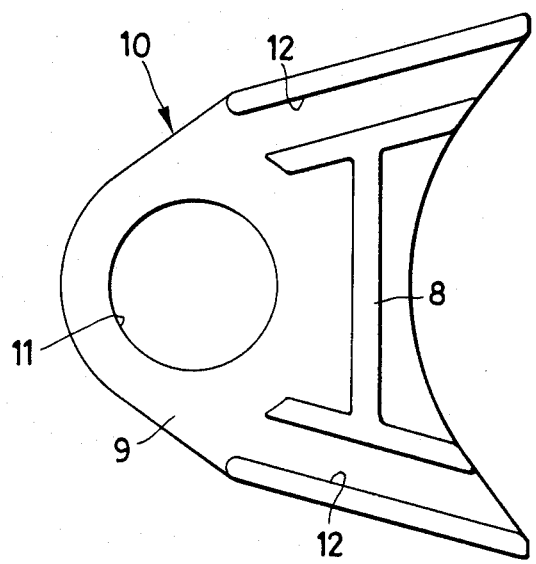
FIG. 1 is a side elevational view showing an idler made according to the present invention.

In the drawings, the idler made according to the invention is generally indicated at 10 and can be made in an entity by a single piece of an appropriate plastics material. The idler 10 has a hub portion 11 having a bore formed through a planar wall 9, and from said hub portion there are extended two diverging guideways 12 having a U-shaped cross-sectional outline and which protrude laterally from the planar wall 9 so as to receive the inner and outer surfaces of the respective laps of the flexible endless drive member. A stiffening rib 8 connects the guideways 12.

On considering the practical example of a timing mechanism with chains and pinions in an internal combustion engine, the idler is mounted between the gears 13 and 14 with its hub portion 11 freely rocking on the drive shaft 15. To this end, the idler 10 has an appropriate arcuate outline in its portions which confront the gears 13, 14 of the timing mechanism, the chain of which has its laps 18 and 19 sliding within the respective guideways 12.

If the drive shaft 15 is rotated clockwise, the taut lap of the chain is the bottom lap 18, whereas the slackening lap is the top lap 19.

During motion, since the lowest engine RPMs, the taut lap takes a certain stiffness which is due to the pulling component of the rotary motion.

The stiffness taken by the taut chain lap is such as to prevent an elastic collapse of the same lap in the transversal direction. Thus, as the slackening lap begins to oscillate transversally, then the taut lap reacts resiliently and restrains the amplitude of the idler rotations about the drive shaft 15 and the result is that the oscillations and the flutterings of the chain slackening lap are reduced in amplitude.

This fact, is actually the origin of a drastic reduction of the roller chain so that the noise of the chain is considerably reduced.

Figure 4:
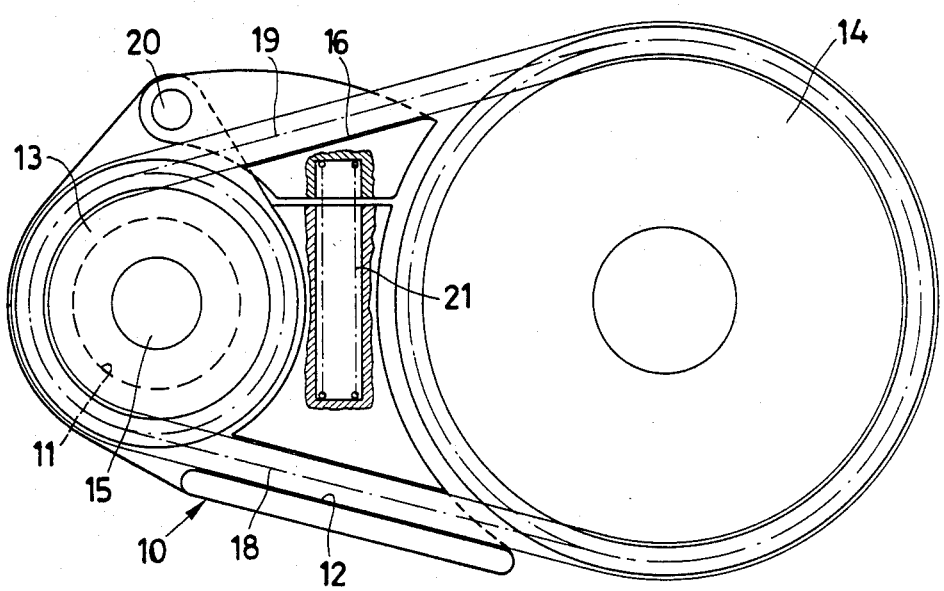
FIG. 4 is an elevational view akin to that of FIG. 2, but showing an alternative embodiment.

FIG. 4 shows an alternative embodiment of the invention, according to which a planar top guideway 16 is pivoted to the hub portion 11, at 20, in a freely rockably manner. A spring 21 keeps the guideway in operational contact with the chain top lap 19.

In such a case the result is a more elastic dampening of the chain oscillations and a positive action of takeup of the possible chain elongation. These facts originate a more even motion of the timing assembly and an improved reduction of the roller chain wear.

An important property of the pad according to the invention is that it can be applied to existing engines without modifying the engine bedplate.

I claim:

1. In a drive system which includes a flexible endless drive member looped over a first rotatable member mounted on a shaft and at least a second rotatable member, said shaft having an axis, the endless drive member during operation having a taut lap and a slack lap each having an inner surface and an outer surface, the improvement comprising a unitary rigid rocking guide pad mounted for pivotable movement on said shaft, said guide pad having two non-rotatable rigid guide channels each having two spaced-apart guide surfaces which face each other in directions transverse to the axis of said shaft, said surfaces of each channel being engageable by the inner and outer surfaces of one of the laps to thereby reduce oscillation of said laps, and said guide pad being supported solely by said shaft and said laps.

2. A rocking guide pad for reducing oscillations of an endless drive member in a drive system of the kind which includes a rotatable shaft, a wheel mounted on the shaft for rotation therewith and a flexible endless drive member trained over the wheel and having a taut lap and a slack lap each of which has an inner surface and an outer surface, said rocking guide pad including first and second parts, said first part including a hub portion having a bore therethrough, said bore having an axis and being adapted to be mounted for free rotation on said shaft and having a rigid guide channel extending from said hub portion, said channel having non-rotatable sides facing each other in a direction transverse to the axis of said bore, said channel being so located as to receive and engage between its sides the inner and outer surfaces of one of the laps of the endless drive member, said second part of said guide pad being pivotally connected to said first part for swinging motion about an axis which is parallel to the axis of said bore and which is located adjacent said bore, said second part having a planar guideway so located as to be engageable with the inner surface of the other lap of the endless drive member, and bias means connected between said first and second parts and resiliently urging said second part toward its respective lap.

3. In a drive system which includes a flexible endless drive member looped over a rotatable member mounted on a shaft and at least one other rotatable member and having during operation a taut lap and a slack lap adjacent the rotatable member, each lap having an inner surface and an outer surface the improvement comprising a rocking guide pad which includes first and second parts, said first part including a hub portion having a bore therethrough mounted for free rotation on said shaft and having a non-rotatable rigid guide channel extending from said hub portion, said channel having sides facing each other in a direction transverse to the axis of said bore, said channel being so located as to receive and engage between its sides the inner and outer surfaces of the taut lap of the endless drive member, said second part of said guide pad being pivotally connected to said first part for swinging motion about an axis which is parallel to the axis of said bore and which is located adjacent said bore, said second part having a planar guideway so located as to be engageable with the inner surface of the slack lap of the endless drive member, and bias means connected between said first and second parts and resiliently urging said second part toward the slack lap.

* * * * *